United States Patent
Freifeld

[11] Patent Number: 5,825,666
[45] Date of Patent: Oct. 20, 1998

[54] OPTICAL COORDINATE MEASURING MACHINES AND OPTICAL TOUCH PROBES

[76] Inventor: Daniel Freifeld, 32 Clapboard Hill Rd., Westport, Conn. 06880

[21] Appl. No.: 482,978

[22] Filed: Jun. 7, 1995

[51] Int. Cl.⁶ .......................... G01B 11/03; G01B 5/004; G01B 5/20; B23Q 3/155

[52] U.S. Cl. .......................... 364/560; 33/503; 33/504; 279/128; 356/2; 356/375; 356/376; 364/559; 483/59

[58] Field of Search .............................. 33/503, 504, 556, 33/559, 560, 561; 250/559.19, 559.22; 279/128; 356/2, 375, 376; 364/559, 560; 483/59; 382/201

[56] References Cited

U.S. PATENT DOCUMENTS

| | | | |
|---|---|---|---|
| 4,276,698 | 7/1981 | Dore et al. | 33/174 L |
| 4,316,329 | 2/1982 | Watson | 33/169 C |
| 4,338,722 | 7/1982 | Delmas | 33/174 L |
| 4,360,973 | 11/1982 | McMurtry | 33/174 L |
| 4,364,178 | 12/1983 | Huet | 33/174 L |
| 4,373,804 | 2/1983 | Pryor et al. | 356/1 |
| 4,453,082 | 6/1984 | Pryor | 250/561 |
| 4,574,199 | 3/1986 | Pryor | 250/561 |
| 4,583,000 | 4/1986 | Pryor | 250/561 |
| 4,637,119 | 1/1987 | Schneider et al. | 33/561 X |
| 4,649,623 | 3/1987 | Schneider et al. | 33/561 X |
| 4,792,698 | 12/1988 | Pryor | 250/561 |
| 4,839,526 | 6/1989 | Pryor | 250/561 |
| 5,028,901 | 7/1991 | Enderle et al. | 33/561 X |
| 5,041,806 | 8/1991 | Enderle et al. | 33/561 X |
| 5,125,035 | 6/1992 | McCarthy et al. | 382/8 |
| 5,144,150 | 9/1992 | Yoshizumi et al. | 250/559.4 |
| 5,154,002 | 10/1992 | Ulbrich | 33/558 |
| 5,319,442 | 6/1994 | Rosser | 356/375 |
| 5,327,657 | 7/1994 | Hajdukiewicz et al. | 33/503 |
| 5,404,649 | 4/1995 | Hajdukiewicz et al. | 33/503 |
| 5,435,072 | 7/1995 | Lloyd et al. | 33/561 X |
| 5,615,489 | 4/1997 | Breyer et al. | 33/503 |

*Primary Examiner*—Edward R. Cosimano
*Attorney, Agent, or Firm*—Handal & Morofsky

[57] ABSTRACT

The optical touch probe has a first target at the distal end thereof on the contact element in a standard probe. The probe is mounted to a video camera of an optical coordinate measuring machine to image the target on the camera. Movement and position of the target in the X and Y coordinates is indicated by the machine's computer image processing system. A second target is mounted to the proximal end of the probe and indicates movement and position in the Z coordinate. The second target may obscure a photodetector, but preferably is parfocused on the camera by light beam parallel to the X,Y plane. Preferably there are two second targets illuminated by orthogonal beams parallel to the X,Y plane. Rotation around the Z axis then may be calculated by the computer when star probes are used. Auto changing racks are also disclosed for holding multiple probes, a probe holder, and lenses for selective mounting on the camera.

60 Claims, 13 Drawing Sheets

Nominal Position

Move predominately in +x

Move predominately in +y

Move predominately in +z

Rotation only

Rotation and move predominately in +y

OPTICAL COORDINATE MEASURING MACHINES AND OPTICAL TOUCH PROBES

TECHNICAL FIELD

This invention relates to optical coordinate measuring machines and optical touch probes. More particularly it relates to optical touch probes wherein motion along each of three mutually orthogonal Cartesian coordinates (X, Y, Z) and rotation (R) about the Z coordinate is measured optically—preferably by parfocal projection of images of three targets onto the focal plane of an optical-electrical image transducer such as a two-dimensional charge coupled array or video camera. Preferably the optical-electrical image transducer is the video camera of an optical coordinate measuring machine. The optical touch probe provides optical detection of X, Y, Z and R positions and i, j, k Vectors normal to the surface of a workpiece.

BACKGROUND ART

The most sophisticated prior art coordinate measuring machines provide for relative motion along three Cartesian coordinates between a workpiece to be measured and a video camera, a laser ranging device, or laser triangulation device, or the touch probe known as the Renishaw™ probe manufactured by Renishaw Metrology Limited in Gloucestershire, UNITED KINGDOM. Each of these systems has various limitations.

For example, certain dimensional inspections cannot be automatically accomplished by video based image analysis because of low contrast or out of focus image conditions—for example, the measurement of a diameter at various depths of a hole. Also features of a workpiece may not be capable of being seen by a video camera system because they are obscured from view.

Laser systems, while quite useful in measuring surfaces directly below their sensing heads, are not particularly useful for taking the dimensions of parts having multiple sided prismatic features.

At present, Renishaw™ probes are the method of choice for measuring most workpieces. These touch probes indicate contact with the part, usually by means of electrical switches (in some cases, other more elaborate methods have been proposed). The inevitable delay between when the part is actually touched by the probe and the transducers actuated thereby are actually actuated (lobbing error) can never be eliminated and limits the accuracy of the measurement. However, video based machines can measure to a sub-pixel—on the order of a tenth of a micron.

In some prior art measuring machines, both touch probes and lasers are provided, such as in the OMS 400 and OMS 600 manufactured by Wegu-Messpechnik GmbH in Germany. U.S. Pat. No. 5,125,035 discloses combining a touch probe and a video camera. Such machines are basically just two inspection devices mounted side by side. While some systems currently do offer a touch probe and a video camera on the same measurement platform (same Z-quill), current approaches incur significant added expense due to the need for separate mechanical packages for each. Certain other systems require a changing station rack to hold the video camera or the touch probe when not in use and provide for automatic mounting of either probe on the measuring stage. Most typically, the touch probe's deflection is sensed by mechanical-electrical transducers usually switch contacts.

U.S. Pat. No. 4,453,082 discloses a probe in which a target on the distal end of the probe is projected onto a photodetector array and motion in the X Y plane is determined by a computer receiving signals from the photodetector array.

U.S. Pat. No. 4,453,082 further discloses that Z motion of the probe might be determined by the change in size of the image of the target on the photodetector array. However, I do not know if such has ever been used in a practical device. The accuracy of this method is problematic. Furthermore, this patent does not disclose or suggest that the photodetector be a video camera in a video based inspection device.

DISCLOSURE OF THE INVENTION

An optical touch probe according to my invention comprises an optical image to electronic signal converter having a focal plane; optical means for focusing an object plane onto said focal plane; a touch probe stylus having at one end a contact tip, typically a ball used to contact the surface of a part under inspection; and a target on said contact tip located on the optical axis of the optical means in the object plane thereof so that the target is imaged on the optical image to electronic signal transducer. An image processing system determines movement of the contact tip in the X and Y directions.

One aspect of the invention is that the optical to electronic signal transducer is the video camera of a video based inspection system.

Another aspect of the invention is that Z axis motion of the contact tip is measured by attaching at least one other target on the stylus and parfocusing (co-imaging) this target on the focal plane of the optical electronic signal transducer. Movement of the images of the additional targets are also analyzed by the image processing system to determine movement along the Z axis of the probe contact tip. The depth of focus of the optical system is large so that the additional targets will remain in focus as they move with the stylus along the Z axis.

Preferably, I provide two arms extending out at right angles from each other and at right angles to the main probe shaft. A target is located near the end of each arm. Light is provided parallel to the arms so that these targets are parfocused on the optical-electronic transducer and their images move proportionatly to motion of the stylus along the Z axis. The first target on the contact tip indicates the amount of motion in the X and Y directions. One of the second and third targets provides measurement of the amount of motion in the X and Z directions and the other in the Y and Z directions if the arms are parallel to the X and Y coordinates. Otherwise these coordinates can be calculated by the system. Rotation of a star probe may thus be measured. Actual position of the contact tip in the three coordinate directions and the amount of rotation about the Z axis can be calculated by Vector analysis.

Preferably to minimize cost, the targets are all parfocused on the focal plane of a video based inspection device. Thus, the optical touch probe of my invention may be utilized as an add-on to an existing computer based video coordinate measuring machine. The contact probe can be removed from the video camera by means of an automatic changing rack or by means allowing rotation of the probe out of view of the video camera. Preferably, one or more of the targets may be such that the type of probe is identified and movement thereof may be determined automatically by the computer analyzing the image.

I have further invented a simple optical head for probes according to my invention which may be racked with the probes and picked up by the video camera and video inspection system. It provides for magnetically picking up from the changing rack individual probes. On probes that are longer than the standard length, or shorter than the standard length, I provide a lens mounted with the probe which changes the object plane of the video camera to bring it to the position of the contact tip choosen.

According to my invention, auxiliary lenses may also be racked with the optical probes to be picked up magnetically by the video camera. I provide a reticle in the rack below each lens such that the video camera can immediately image the reticle and calibrate the system with the new lens attached. This eliminates the need for highly accurate magnetic contact engagement.

The video camera of my invention can be used in the usual way to perform video inspection and measurement and also allows an operator to view operation of the various contact probes provided in real time as the measurements are made.

Thus, my invention comprises a method of operating a video touch probe such that at least two or three targets are parfocally imaged on the focal plane of an optical-electronic imaging transducer to produce a signal which may be analyzed to determine motion of the contact tip of the probe along the three Cartesian coordinates and rotation about one of the Cartesian coordinates. My invention also comprises parfocusing at least two targets on a touch probe on the video camera of a video based inspection or coordinate measuring machine.

Using my invention, the measurements taken by the video camera based image processing coordinate measuring machine and those taken by the optical contact probe are in the same coordinates (same frame of reference).

OBJECTS OF THE INVENTION

It is therefore an object of the invention to provide an optical touch probe.

Another object of the invention is to provide an optical touch probe attachment to a video based coordinate measuring machine that utilizes the video camera of the machine to indicate motion or position of the contact tip.

A further object of the invention is to increase the frequency of contact tip position determination in coordinate measuring machines.

Yet another object of the invention is to provide for the use of interchangable probe styli.

A yet further object of the invention is to increase the accuracy of touch probes.

Yet still another object of the invention is to provide touch probes free of lobbing error.

A yet still further object of the invention is to reduce the probing forces applied by touch probes.

Yet another object of the invention is to provide an automatic changer for optical touch probes such that recalibration of newly mounted probes is not needed and highly accurate mechanical registration of the probes on a Z-quill is not required.

Yet further objects of the invention are to provide for visual sighting of the area being probed; to provide stylus crash protection; to provide for the use of star probes; to measure the rotation of star probes optically; to use them as triggering devices; to provide for automatic recognition of the character of individual probes by analysis of the signals from an optical-electronic image transducer; and to reduce the cost and improve the durability of touch probes.

Other objects of the invention will in part be obvious and will in part appear hereinafter.

The invention accordingly comprises the several steps and the relation of one or more of such steps with respect to each of the others of a method, and apparatus embodying features of construction, elements, and arrangements of parts which are adapted to effect such steps, all as exemplified the following detailed disclosure.

The scope of the invention is indicated in the claims.

BRIEF DESCRIPTION OF THE DRAWINGS

For a fuller understanding of the nature and objects of the invention, reference should be had to the following detailed disclosure, taken in connection with the accompanying drawings, in which.

The same reference characters refer to the same elements throughout the several views of the drawings.

BEST MODE FOR CARRYING OUT THE INVENTION

Figure 1:
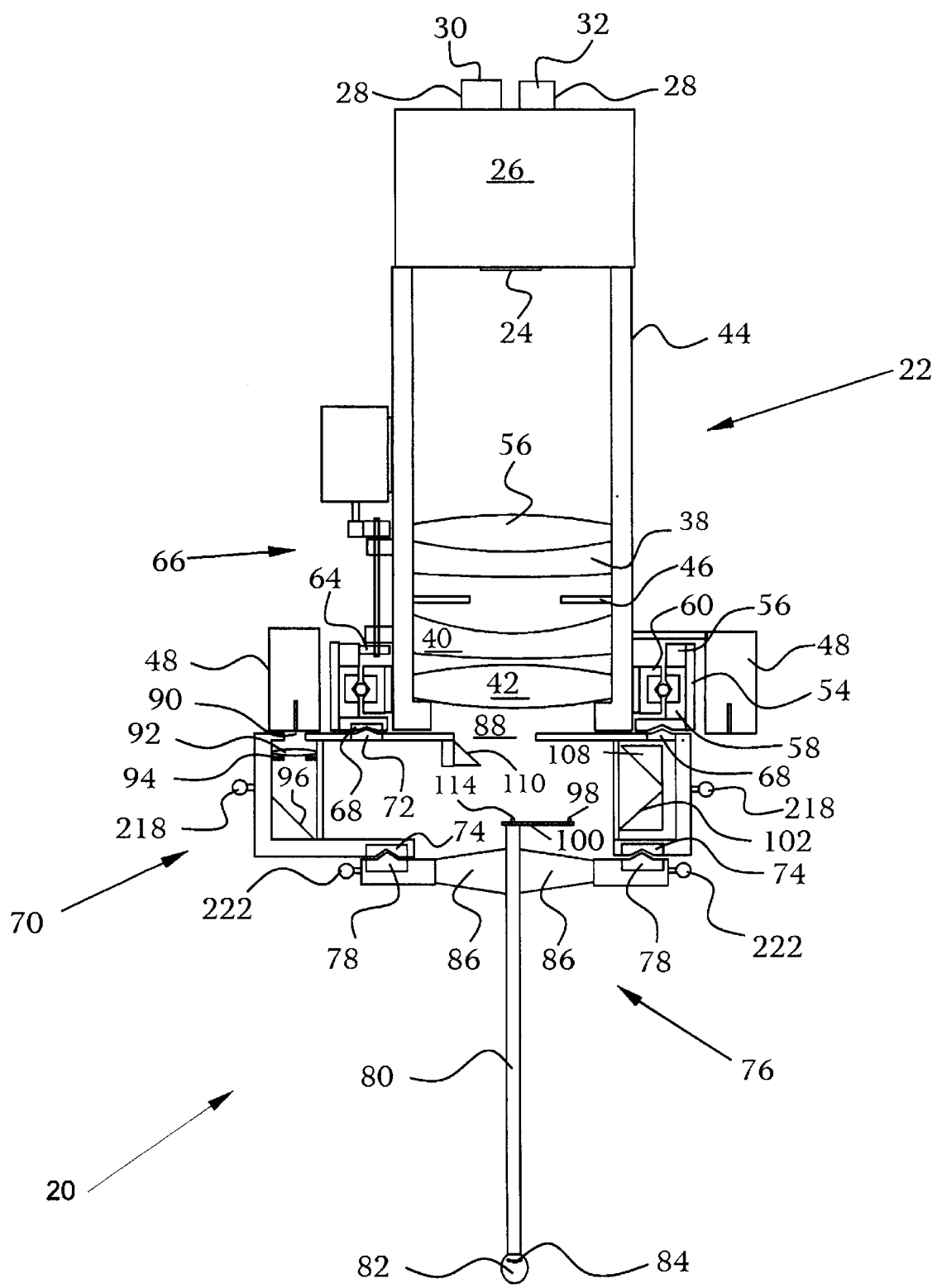
FIG. 1 is a diagrammatic cross-sectional front view of a portion of an optical coordinate measuring machine according to my invention, showing an optical touch probe assembly according to my invention attached to the video camera of a video based coordinate measuring machine.

Now referring to FIG. 1, an optical probe assembly (generally indicated at 20) according to my invention is mounted to the video camera or probe 22 of a video based inspection machine. The video camera 22 comprises an optical image to video signal transducer such as a charge-coupled array 24, associated electronics 26, connectors 28, and cables 30 and 32 connected to image processing electronics 280 (see FIG. 21). The camera further comprises lenses 36, 38, 40, and 42 for focusing an object plane upon the focal plane of the camera 22, that is, on the charge-coupled array 24. The lenses are mounted within a barrel 44. I provide an iris 46 for changing the depth of field achieved by the lenses 36, 38, 40, and 42.

The camera 22 is also provided with a ring light 48 for illuminating a workpiece (not shown). The camera is mounted in the Z-quill 50 of a coordinate measuring machine, generally indicated at 52 in FIG. 8.

According to my invention, I provide for a ring bearing, generally indicated at 54, mounted on the barrel 44. A ring rack 56 is mounted to the outer ring 58 of ring bearing 54. The inner ring 60 is mounted to the barrel 44. I provide a motor 62 for driving a pinion 64 through a gear train (generally indicated at 66) for rotating the ring gear 56 about the barrel 44. Also mounted to outer bearing ring 58 are four dimpled magnetic mounting means 68, only two of which are shown in FIG. 1 (see also FIG. 5).

According to my invention, I provide an optical probe head, generally indicated at 70, which is provided with cooperating cone shaped magnetic means 72 which fit into and magnetically attached to dimpled magnetic means 68. Probe head 70 is also provided with dimpled magnetic means 74 for picking up a probe assembly, generally indicated at 76. Probe assembly 76 has cooperative conical shaped magnetic means 78 which magnetically lock to magnetic means 74. Probe assembly 76 is provided with a stiff shaft 80 of conventional material used in the art and with a conventional contact tip 82 at its distal end whereon, according to my invention, I mount a target 84. The target 84 is located in the object plane of the camera 22 and is thus focused in the focal plane at the charge coupled device 24. Thus, motion of the contact tip 82 and target 84 in the X, Y plane will cause the image of the target 84 to correspondingly move in the focal X, Y plane 24 of the camera 22.

Now referring to FIGS. 1 ahd 2, the shaft 80 of the probe assembly 76 is supported on four elastic supports 86. These are conventional and their stiffness (spring constant) is determined by the type of measurement to be performed by the probe 76.

The contact tip 82 and target 84 may be viewed by the camera 22 through aperture 88. An aperture 90 in the optical probe head 70 allows light from the ring lamp 48 to be gathered by lens 92. The light passes through aperture stop 94 to mirror 96 where it is directed to illuminate cone like target 98 mounted on arm 100. This light is directed by mirror 102 to mirror 108 and then to mirror 110 where it is parfocused on focal plane 24 by the camera lens elements 36, 38, 40, and 42. Another aperture 112 (FIGS. 2 and 3) is provided in probe head 70 with an identical optical system for illuminating conical target 114 on arm 116 and thus directing its image to mirror 111 and parfocusing it on focal plane 24.

Figure 2:
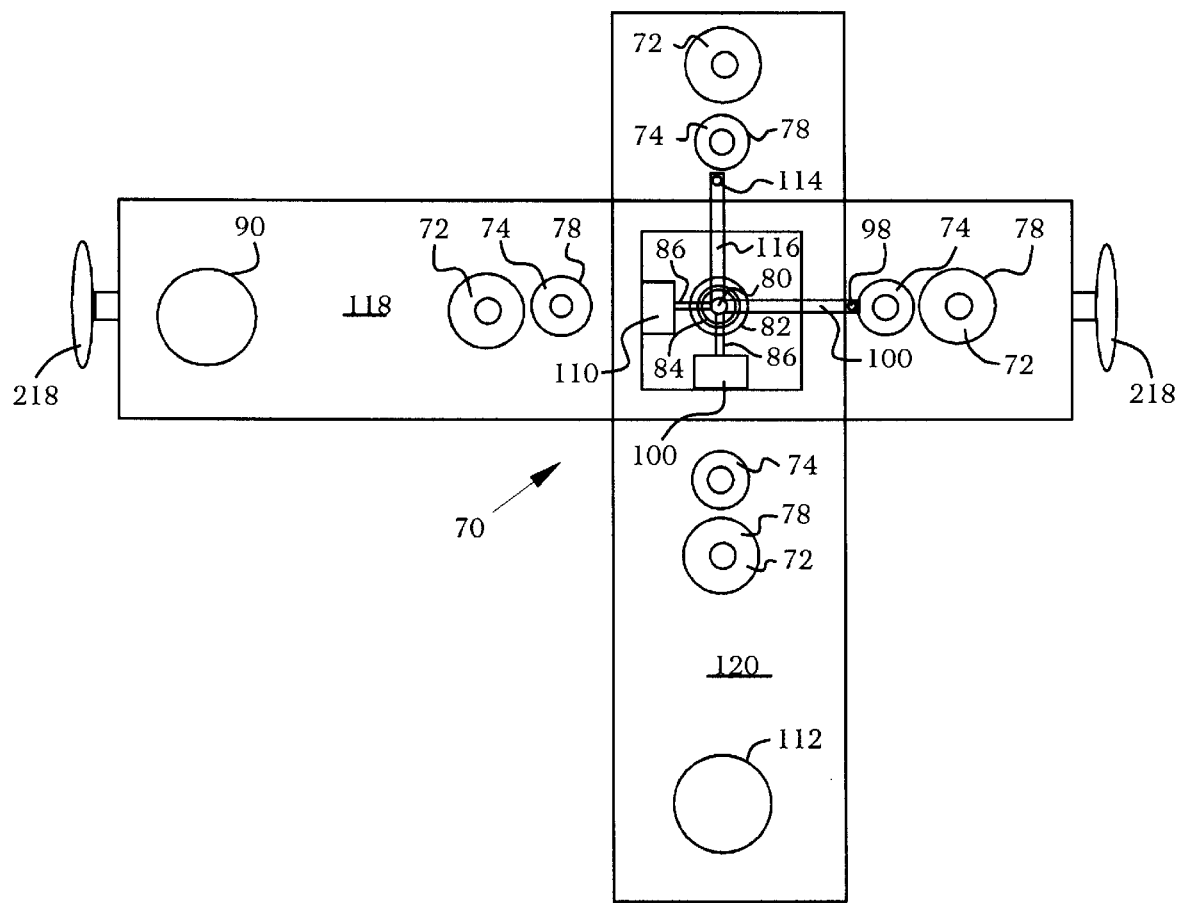
FIG. 2 is a diagrammatic top view of the optical probe head of my invention shown in FIG. 1.

Now referring to FIG. 2, it can be seen that aperture 90 is located in long arm 118 and aperture 112 is located in long arm 120 of probe head 70.

Figure 4:
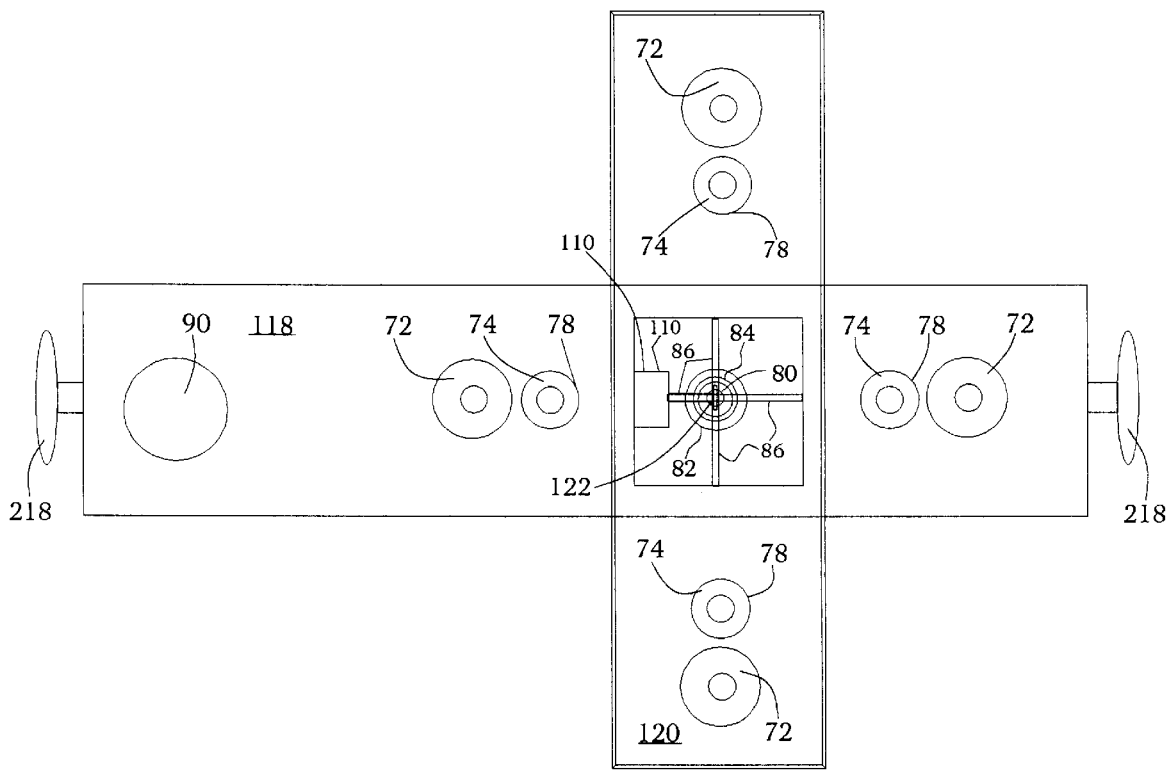
FIG. 4 is a diagrammatic top view of an alternative optical probe head assembly according to my invention holding another optical probe assembly according to my invention.
Figure 7:
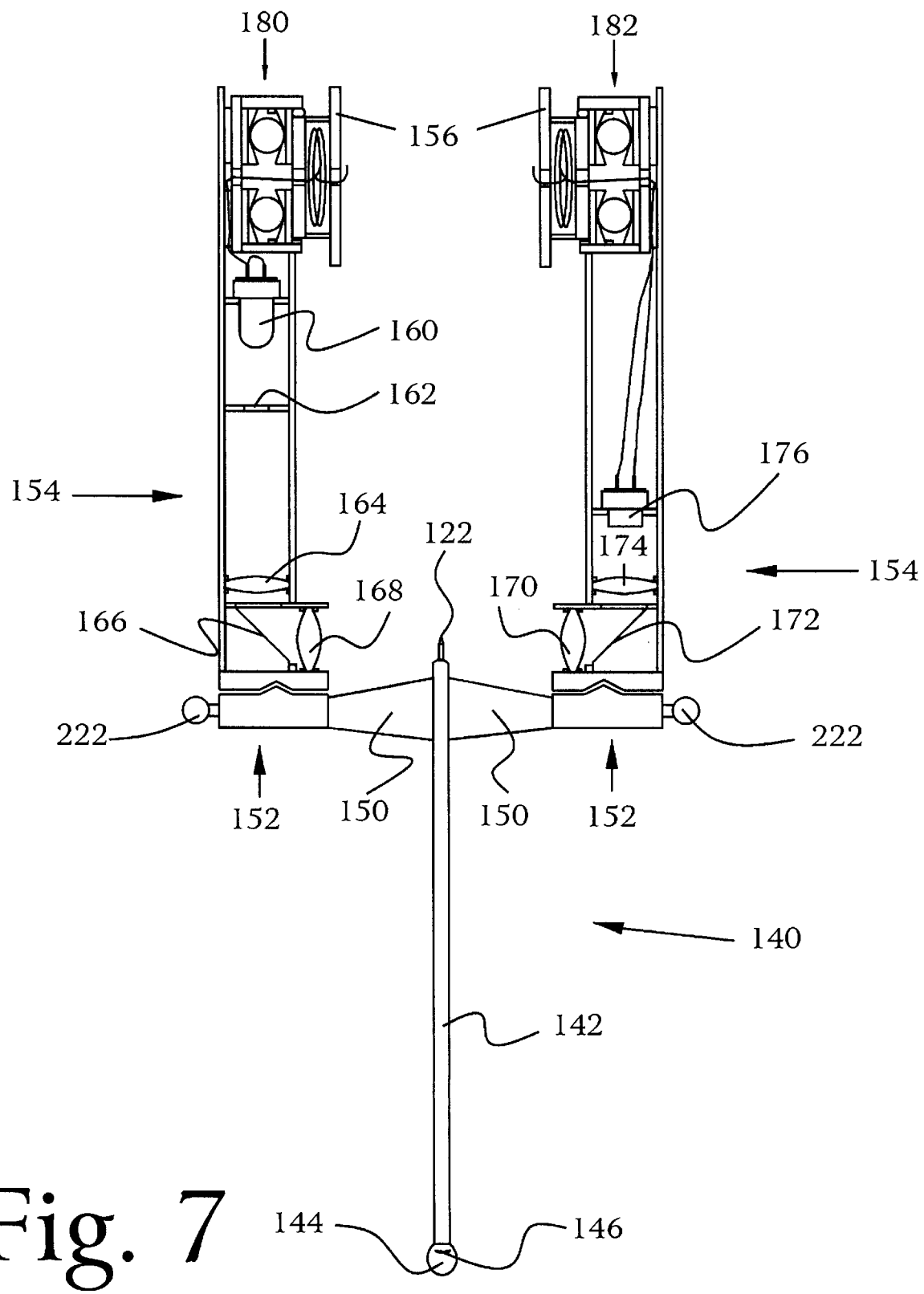
FIG. 7 is a diagrammatic cross-sectional side view of an alternative optical probe head according to my invention holding an alternative optical probe assembly according to my invention similar to that shown in FIG. 4.

Now referring to FIGS. 4 and 7 the top of probe shaft 80 may be provided with a single target cone or knife edge 122. This arrangement may be utilized when no star probes are utilized requiring an indication of rotation of the contact tip 82 about the axis of the shaft 80. Alternatively, other optical means can be utilized for measuring the Z motion, such as a triangular aperture and a knife edge (see FIG. 7), such that, the knife edge is horizontal and the aperture apex of the triangular aperture (not shown) is vertically oriented. Obscuration of the light beam illuminating the aperture is proportional to Z motion of the shaft 80.

Figure 3:
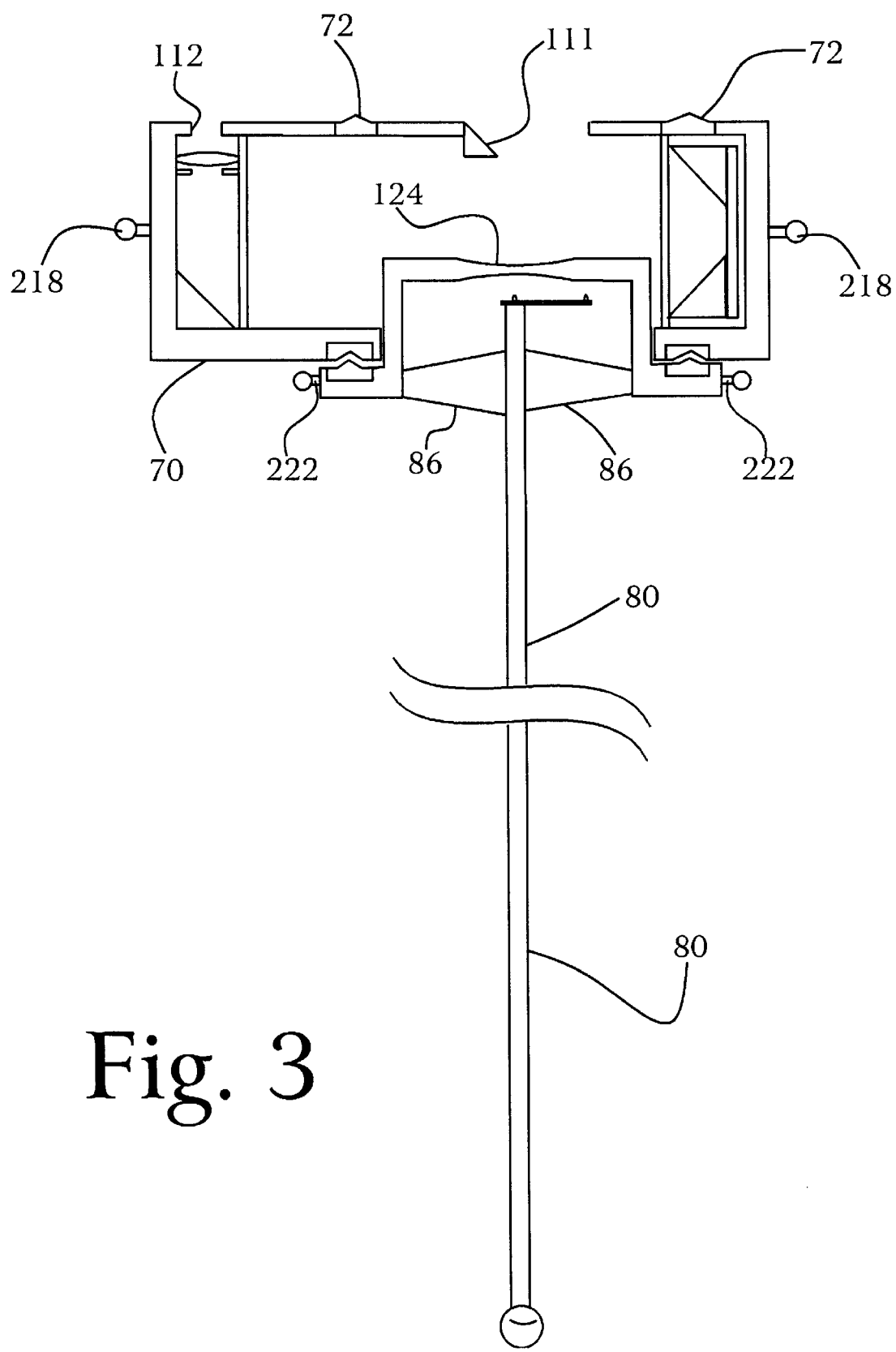
FIG. 3 is a diagrammatic cross-sectional side view of the optical probe head of FIGS. 1 and 2 holding an alternative optical probe assembly according to my invention.

Referring to FIG. 3, when a long shaft 80' is utilized, I mount an appropriate lens 124 which places the object plane of the video camera at the target 84' on the contact tip 82'.

Figure 5:
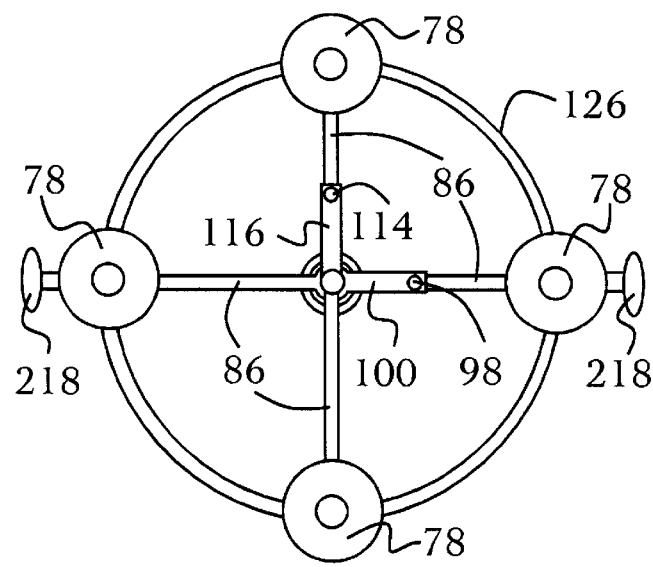
FIG. 5 is a top view of the optical probe assembly shown in FIG. 1.

Referring to FIG. 5, it can be seen how the probe assembly 76 comprises a circular mounting ring 126 to which conical magnetic elements 78 are affixed. The elastic supports 86 are clearly visible as are the arms 100 and 116 and their respective targets 98 and 114.

Figure 6:
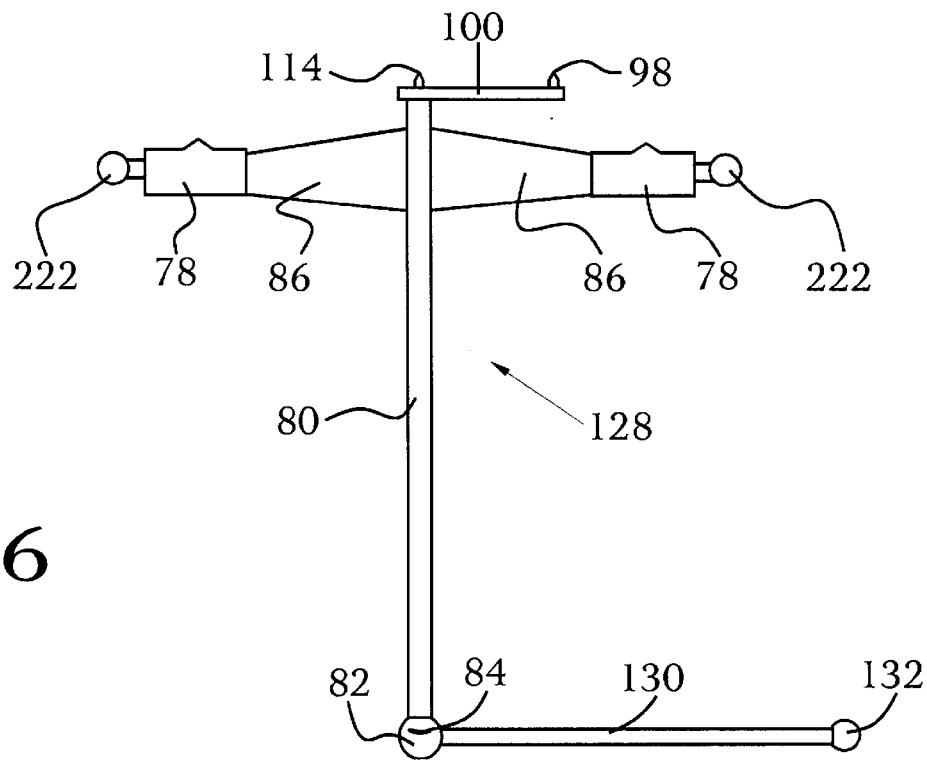
FIG. 6 is a diagrammatic cross-sectional side view of another alternative optical probe assembly according to my invention.

In FIG. 6, I have shown a star probe assembly, generally indicated at 128. It comprises elements identical to probe assembly 76 of FIG. 1, except for the addition of a horizontal arm 130 extending from contact tip 82 and having a contact tip 132 at its distal end.

Now referring to FIG. 7, as previously described, when it is not necessary to determine rotation of a probe, a simpler set up may be utilized according to my invention. A probe, generally indicated at 140, comprises the usual stiff shaft 142, contact tip 144, contact tip target 146, and resilient mounting means 150 and magnetic attachment means, generally indicated at 152, for mounting the contact probe 140 to a probe head generally indicated at 154. The optical probe head 154 is mounted to a video camera 156 of video based inspection system.

In this case, only the target 146 is imaged on the focal plane (not shown) of the video camera 156. A knife edge 122 is mounted to the top of shaft 142. A light emitting diode 160, aperture 162, lens 164, mirror 166, and lens 168 collimate this light on the knife edge 122. Lens 170, mirror 172, lens 174, capture the light passing above knife edge 158 and direct it to a photo diode 176. As knife edge 122 moves upward, it obscures more of the collimated beam and less light reaches photo diode 176. As it moves down, more light passes over the top of knife edge 122 and falls on photo diode 176. Thus, a change in signal from diode 176 will indicate upward or downward motion of knife edge 122 and thus the contact tip 144. As far as Z motion is concerned, the apparatus from FIG. 7 performs the function of opening or closing an electrical contact in a conventional Renishaw™ probe but with more accuracy. Bearings, generally indicated at 180 and 182, allow the entire optical probe head 154 to be tilted upwardly out of the page so that the view of the camera 156 is unobscured when an optical probe 140 is not in use.

When more accuracy is desired in measuring the Z direction and in particular when it is desirable to measure the actual amount of motion (distance) along the Z axis, a triangular slit and the knife edge 122 may be utilized provide precise linearity of obscuration of a triangular slit (not shown) on the diode 176 of the image of knife edge 122, as previously described.

Figure 8:
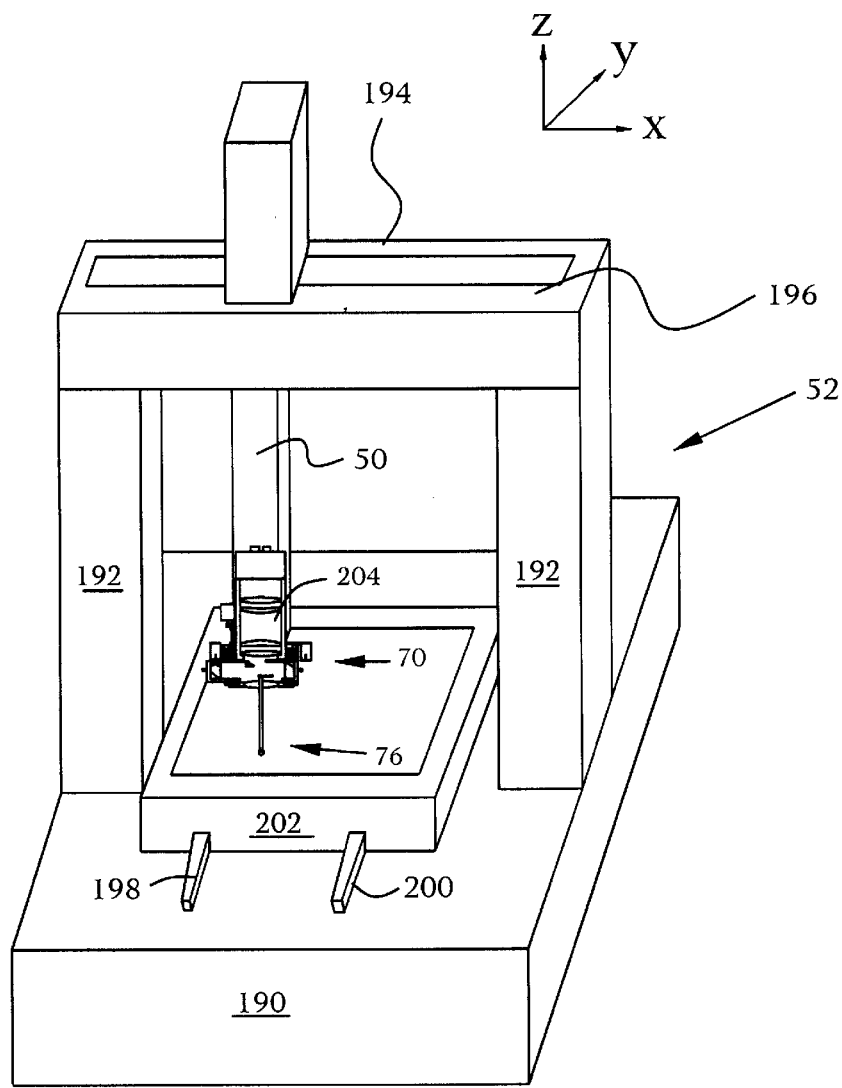
FIG. 8 is a diagrammatic three-dimensional view partially in cross-section of a coordinate measuring machine according to my invention employing the apparatus according to my invention shown in FIG. 1.

In FIG. 8, there is shown a conventional coordinate measuring machine, generally indicated at 52, having a heavy base 190, usually of granite; vertical pillars 192 to which X ways 194 and 196 and X scale (not shown) are mounted. Z-quill 50 moves on X ways 194 and 196. Y motion is provided by mounting ways 198 and 200 on base 190 on which Y moving platform 202 moves.

A conventional video camera 22 is shown mounted in the Z-quill 50 and is moved up and down in the Z direction by convention means (not shown) within the Z-quill 50. To this, the apparatus according to the invention, generally indicated at 204, and shown in detail in FIG. 1 is mounted. Thus, a conventional video based inspection system may be easily modified to employ my invention for touch probe measurements.

Figure 9:
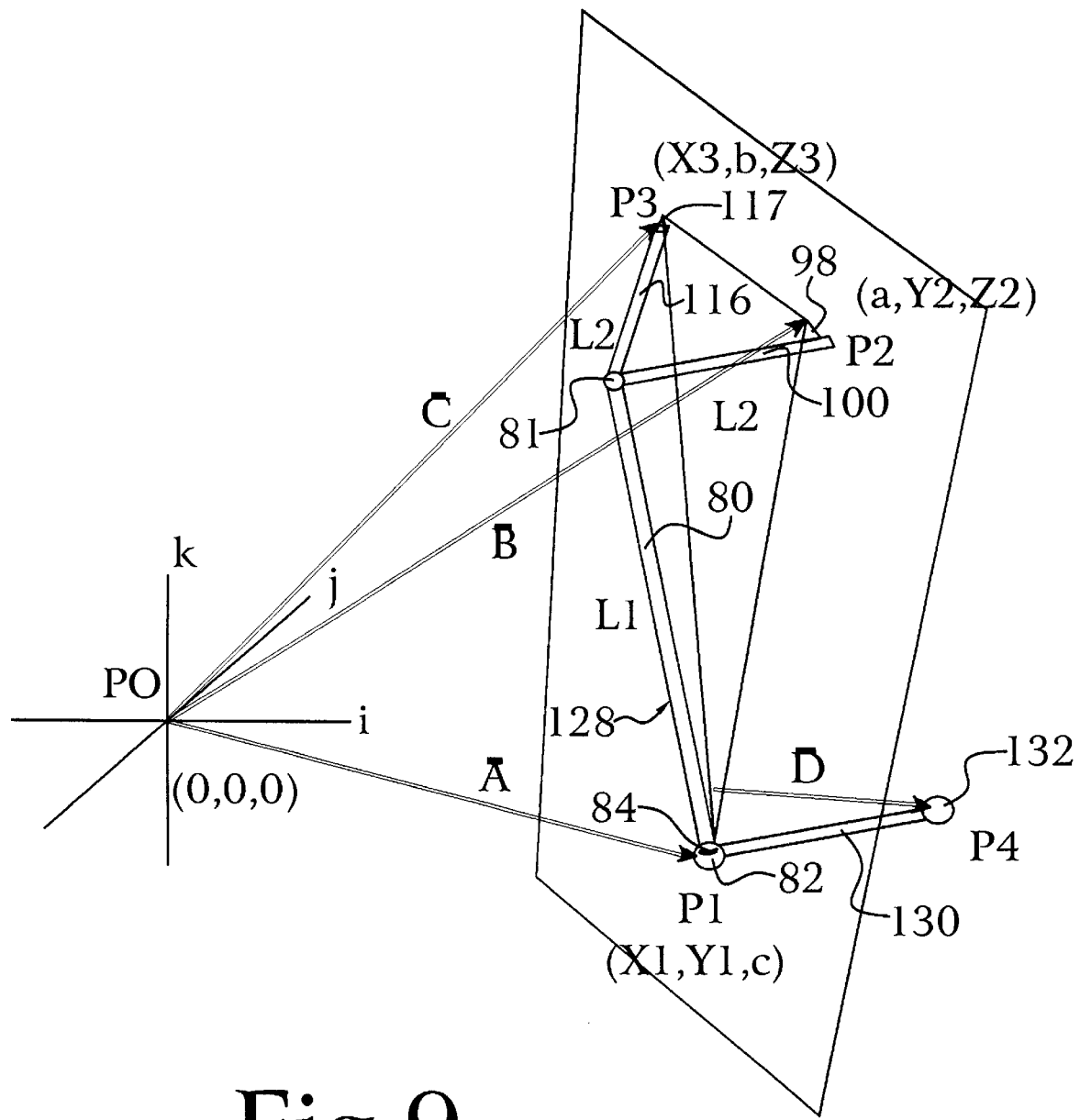
FIG. 9 is a diagrammatic view showing how the position of the off-set contact tip of the optical touch probe shown in FIG. 6 may be calculated using Vector analysis.

FIG. 9 shows star probe 128 of FIG. 3. Principal points P2 and P3 are the tips of the targets 98 and 114 and principal point P1 is the center of the target sphere 82. A plane is formed by these three points. The zero is at P0. It is the coordinate measuring machine's origin 0,0,0 coordinates. The normal Vector $\overline{D}$ extends from the plane of P1, P2, and P3 to point P4, the center of contact tip 132 of the star probe 128. Since the entire assembly 128 is rigid, dimensional relationships between P1, P2, P3, and P4 remain invariant. To determine the absolute X, Y, and Z position of P1, P2, and P3, we need to know L1, L2, and L3. L1 is the distance between the top 81 of shaft 80 and L2 and L3 are the length of arms 116 and 100, i.e. the perpendicular distance from the axis of shaft 80 to points P2 and P3. To obtain these, we use Vector Algebra to establish a series of three equations and three unknowns which are solvable by computer reiteration techniques.

Given the X, Y, and Z values of the three cardinal points of the stylus 128, that is P1, P2, and P3; we can, due to the rigidity of the stylus, know the X, Y, and Z values of P4 at the star probe tip 132 in contact with the part. In my optical touch probe, we know the X and Y movement that has occurred at P1 and the Y and Z movement of P2 and the X and Z movement of P3 as determined by the video based coordinate measuring machine.

For a stylus with known physical dimensions with two arms of equal length L2 and L3 and a main probe shaft 80 of length L1, all at right angles to each other; the unknown Z axis position of P1 "c", the unknown axis position of P2 "a" and the unknown Y position of P3 "b" can all be extrapolated from a series of three equations and the three unknowns a, b, and c that can be established according to Vector Algebra as follows:

Assume the stylus is in a position in three space where:
For P1, X and Y are known. For P2, Y and Z are known.
For P3, X and Z are known.
P0 is the X=0, Y=0, Z=0 origin of the coordinate system.
Three vectors can be established
$\overline{P1P2} = \overline{B} - \overline{A} = (a_i, Y2_j, Z2_k) - (X1_i, Y1_j, C_k)$
$\overline{P1P3} = \overline{C} - \overline{A} = (X3_j, b_j, Z3_k) - (X1_i, Y1_j, C_k)$
$\overline{P3P2} = \overline{B} - \overline{C} = (a_i, Y2^j, Z2_k) - (X3_i, b_j, Z3_k)$
The length of these vectors is given by $$|P1P2| = \sqrt{(a-X1)^2 + (Y2-Y1)^2 + (Z2-C)^2}$$

$$|P1P3| = \sqrt{(X3-X1)^2 + (b-Y1)^2 + (Z3-C)^2}$$

$$|P3P2| = \sqrt{(a-X3)^2 + (Y2-b)^2 + (Z2-Z3)^2}$$

Now due to the right angle configuration of the stylus and given the simplifying case where L2=L3:
The length of vector P1P2 and P1P3 is given by $\sqrt{L1^2+L2^2}$
The length of vector P2P3 is given $\sqrt{2*L2^2}$
Removing the radical signs we are left with three equations and the three unknowns to be solved for any particular case via computer iteration techniques.
$L1^2+L2^2=(a-X1)^2+(Y2-Y1)^2+(Z2-C)^2$
$L1^2+L2^2=(X3-X1)^2+(b-Y1)^2+(Z3-C)^2$
$2*L2^2=(a-X3)^2+(Y2-b)^2+(Z2-Z3)^2$ In FIG. 10, the image, generally indicated at 250, of the target 84 (FIG. 1) at the distal end of the touch probe 76, is shown a video monitor screen 252. Also shown are the images 254 and 256 of the targets 98 and 114 (FIG. 2). The outline of the mirrors 110 (FIG. 1) and 111 (FIG. 3) are indicated by dotted lines.

Different targets 250, 258, 260, and 262 shown in FIGS. 10 through 13 identify different probes. The targets are recognized by the computer connected to the video camera 26.

Figure 10:
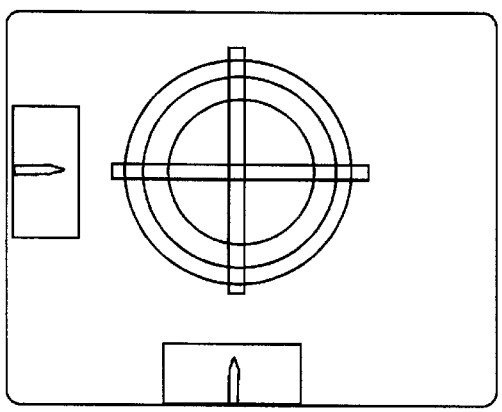
FIGS. 10 through 13 are views of the video screen of an optical coordinate measuring machine according to my invention showing how various probes may be identified by employing different contact tip targets and also showing how the targets on the coordinate arms of an optical touch probe assembly according to my invention are co-imaged parfocally with the touch probe contact tip target on to the focal plane of the video imaging to electrical signal transducer.
Figure 12:
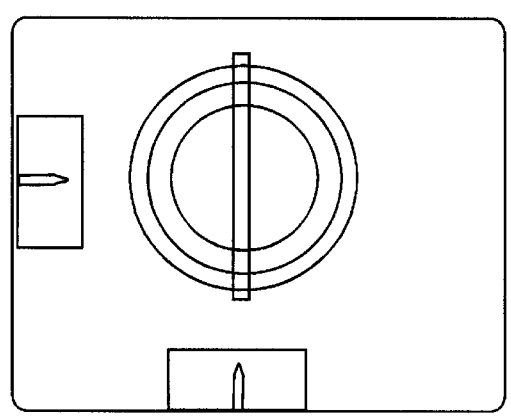
Figure 11:
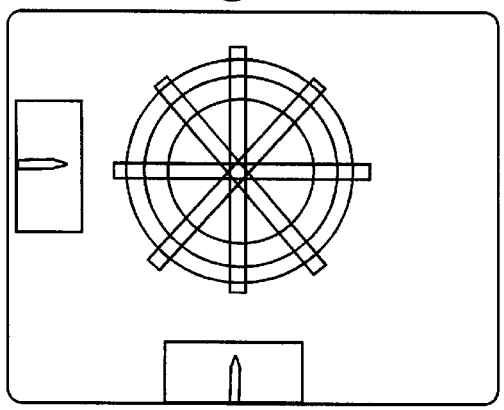
Figure 13:
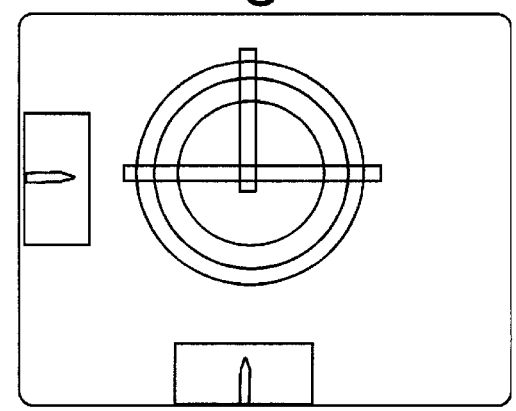

Now referring to FIGS. 14 through 19, various positions of the images 250, 254, and 256 of the targets 84, 98, and 114 of FIG. 10 are shown.

Figure 14:
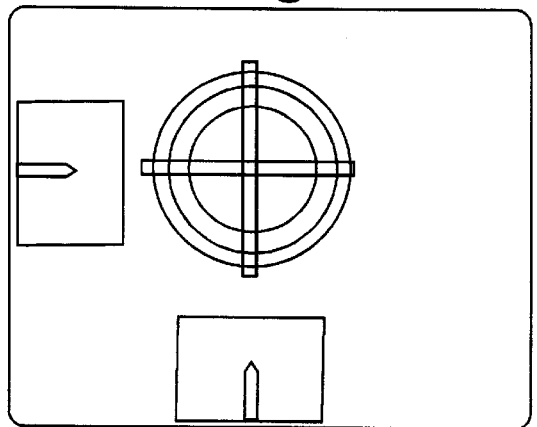
FIGS. 14 through 20 are views of the video screen of an optical coordinate measuring machine according to my invention employing an optical touch probe according to my invention and showing how the images of said targets on the focal plane of the video camera of my invention change after motion of the touch probe tip in each of the three coordinate directions X, Y, and Z, and in rotation R about the Z axis.

FIG. 14 shows the targets 250, 254, and 256 in the nominal 0,0,0 position when the probe is first mounted to the video camera 26. Note that the targets may not be perfectly centered and that they may be rotated. The computer recognizes this and takes it into account in further calculations so that all positions are calculated in the video machines frame of reference. Note also that the coordinate system (frame of reference) of the probe need not be identical to the machine's coordinate system (frame of reference). It need only be transformable mathematically into the machine's coordinate system.

Figure 15:
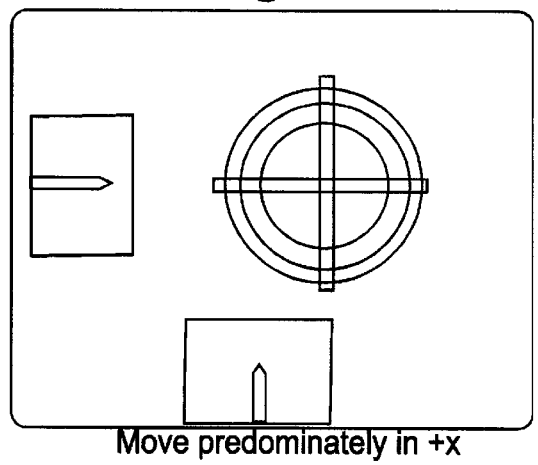

FIG. 15 shows movement predominantly in the +X direction only.

Figure 16:
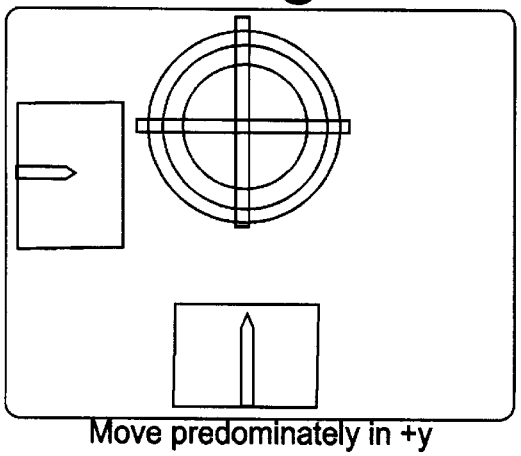

FIG. 16 shows movement predominantly in the +Y direction only.

Figure 17:
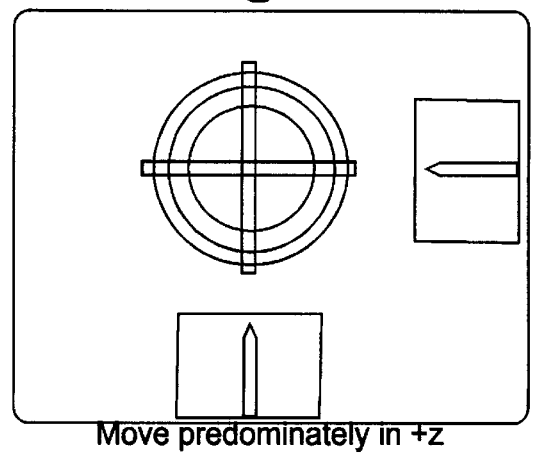

FIG. 17 shows movement predominantly in the +Z direction only.

Figure 18:
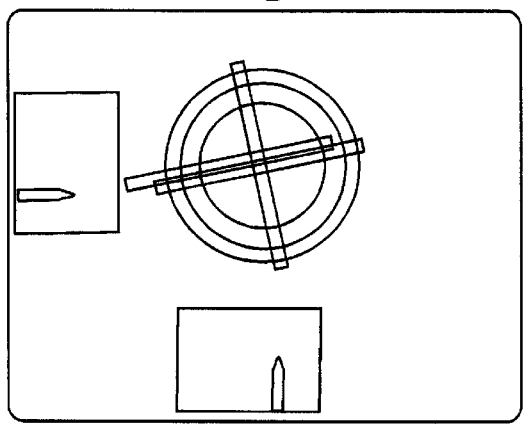

FIG. 18 shows counter-clockwise rotation about the Z axis only.

Figure 19:
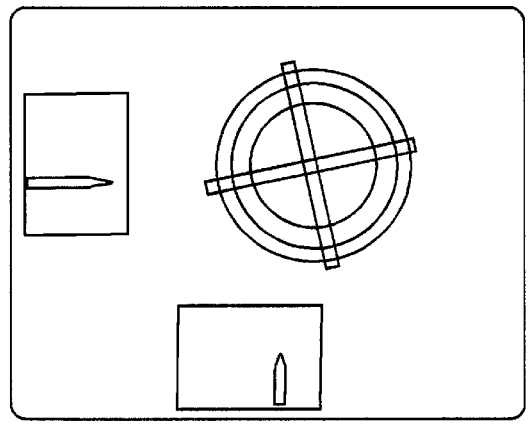

FIG. 19 shows counter-clockwise rotation about the Z axis and movement predominantly in the +X direction only.

Figure 20:
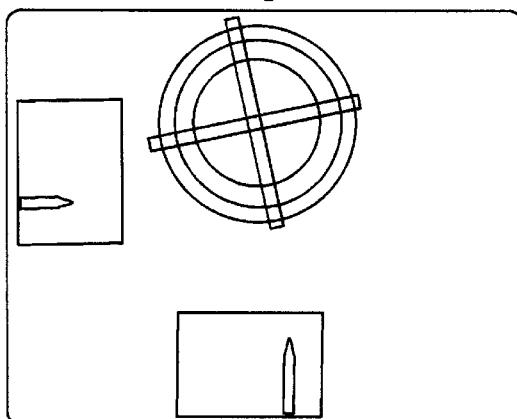

FIG. 20 shows counter-clockwise rotation about the Z axis and movement predominantly in the +Y direction only.

Note that target image 254 indicates motion in the X and Z coordinates by lengthening or shortening and rotation by moving up and down and that target image 256 indicates motion in the Y and Z coordinates by lengthening and shortening and rotation by moving left and right.

Figure 21:
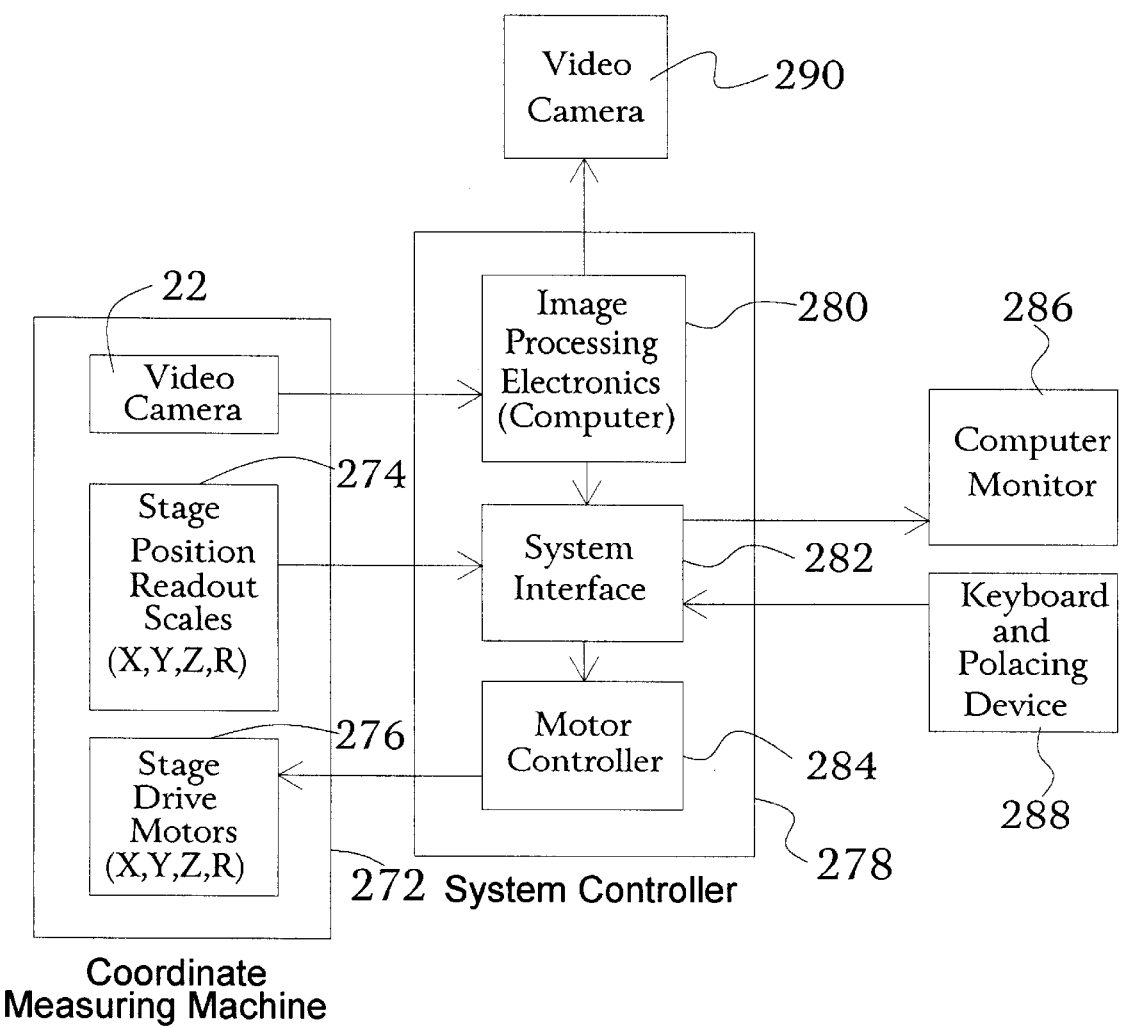
FIG. 21 is a block diagram of the electronics and control system of a coordinate measuring machine system according to my invention.

The electronics and the computer system 270 of the invention is generally indicated in FIG. 21. It comprises a conventional video based coordinate measuring machine 272 comprising a conventional video camera 22, readout scales 274, and drive motors 276; a system controller 278 comprising a conventional image processing electronics (programmed computer) 280, system interface 282, and motor controller 284; a computer monitor 286; a keyboard and pointing device 288 and a video monitor 290.

The only change is to program the computer 280 appropriately to process the target images 250, 254, and 256 to derive the coordinates of the touch probe contact member (e.g. 82 in FIG. 1) and to interpret the target codes.

Since the computer is capable of calculating all coordinates at the refresh rate of the video camera, measurements at points along the surface of a part may be made 30 times per second with a conventional video camera. Even higher rates e.g. 1,000 times per second can be achieved with high speed cameras. The only limitation is the rate at which the probe contact element may be made to engage the part. This speed may be increased by vibrating the contact element toward and away from the surface as the coordinate measuring machine moves the contact element along the surface.

Thus, the i,j,k Vector at a particular location on a part surface may be determined by a 30 frame refresh rate video camera in 1/10 of a second since three (3) contacts with the part establish a tangential plane.

Figure 22:
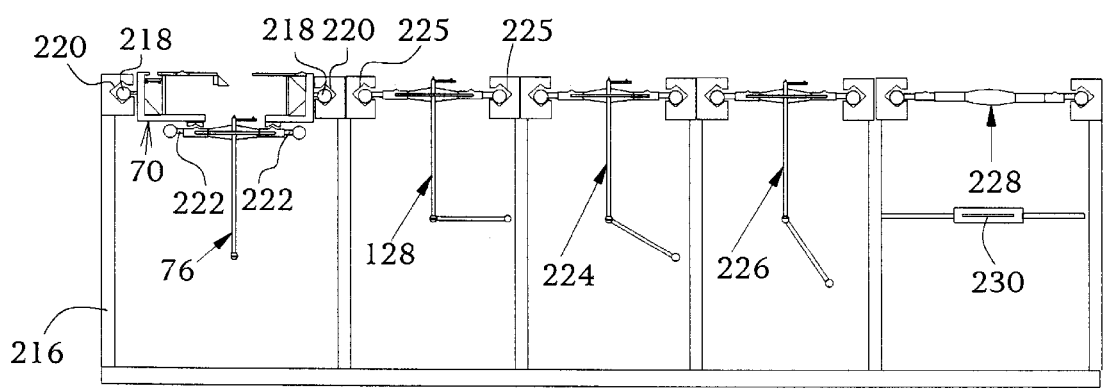
FIG. 22 is a diagrammatic cross-sectional front view of a probe auto change rack according to my invention showing an optical probe head, and various optical probe assemblies according to my invention, and a video camera refocusing lens according to my invention mounted therein; and, FIG. 23 is a diagrammatic top view of the touch probe change assembly shown in FIG. 22.
Figure 23:
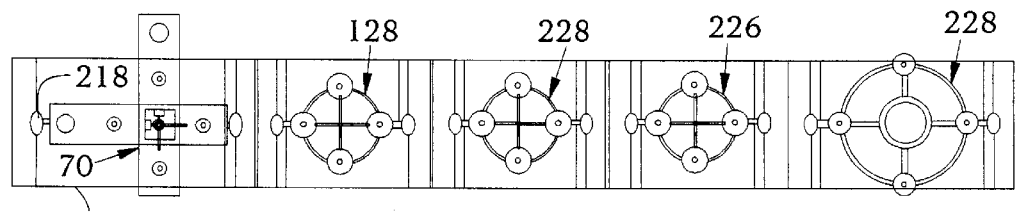

FIGS. 22 and 23 show an automatic rack 216, according to my invention. Elongated keys 218 on optical probe head 70 fit into channels or locks 220 mounted to the rack 216. Similarly, I provide keys 222 on probe assemblies 76, 128, 224, and 226 and lens assembly 228; these fit into channel like locks 225 mounted to the rack 216. Rack 216 may be rectangular as shown or located along the periphery of a circular table. Rack 216, whether circular or rectangular, is moved in and out of the measurement volume of the coordinate measuring machine by conventional means so as not to reduce the measurement volume.

When in use, the rack 216 is moved into the measurement volume and the quill 50 moved over the optical probe head 70. The magnetic means 68 and 72 are locked and this lifts the probe head assembly 70 slightly. The quill then moves the keys 218 into or out of the page, as shown in FIG. 10, until the rack 216 is cleared. The quill 76 may be utilized immediately or, if desired, it may be placed into an empty rack (not shown) and another one of the quills 128, 224, 226, the lens 228, or any other attachment (e.g. a laser measuring device) picked up.

As previously described, the lens assembly 228 can be calibrated by means of the reticle 230 mounted in the rack 216.

It will thus be seen that Z axis motion of my optical touch probe may be determined optically and conveniently with increased accuracy of measurement and is preferably obtained by parfocusing an X and Y target and then a Z target on the focal plane of a charged-coupled array connected to a computer, preferably onto a video camera in an existing video based coordinate measuring machine. Rotation may be measured by establishing two targets at right angles to the Z axis probe shaft and parfocusing these targets and the target on the stylus tip on the same optical-electrical image transducer.

Resolution in my invention is the smallest motion the contact tip can make before the image processing board can detect it has moved. For example, if we have a field of view of 0.050" (1.27 mm) and 500 pixels across the sensor and a 5:1 subpixel analysis capability then 0.000020" (0.0005 mm) resolution can be achieved. A 5:1 or possibly better subpixel ratio is readily achievable here because the target markings can provide the image processing system with ideal contrast and shapes for best possible edge detection.

By reducing the field of view by changing lenses or using a zoom lens, increasing the number of pixels across the sensor, or increasing the subpixel analysis capability this resolution can be improved upon. If for example, the field of view is reduced to 0.010" (0.25 mm) and a 1000 pixel camera is used with a 10:1 subpixel analysis capability then a system resolution of 0.000001" (0.000025 mm) can be achieved. This resolution is sufficient for performing surface roughness measurements and calibration of high precision gages and artifacts. Thus, dimensional measurement, form, and surface roughness characteristics can be determined on one machine using my probe. To achieve this versatility, the measuring system would typically be equipped with my stylus changer and the Optical Touch Probe would choose between a stylus with size, shape, and field of view determining optics best suited for the task at hand.

Measurement with Optical Touch Probe can be done in a high speed scanning mode since a new probing stylus position determination are made at video refresh rates. If the probing stylus is brought into contact with the surface of the part under inspection and dragged along the part's surface, points can be acquired at the video refresh rate assuming the image processing system can keep pace. Often, the form (roundness, concentricity, etc.) of a shaft or cylinder or other surface is a required measurement. My highly accurate Optical Touch Probe is useful for making such measurements, especially when the measuring system is equipped with a rotary table. Current commonly available scanning probes are fairly expensive. My invention provides better performance at greatly reduced cost. My Optical Touch Probe may also be used for reverse engineering and provides highly accurate digitizing of the part being reverse engineered.

For highly accurate measurement of surface finish and the like, a laser measurement system is incorporated into the optics of the video coordinate measuring machine of the invention. This can be unitary with the video camera or a rackable adapter like probe adapter 70 of FIG. 1.

The probe as described could also be used more simply, but at a loss of versatility and accuracy as a triggering style device. The probing stylus is mounted with a rather stiff rubber or mechanical support that has excellent memory, meaning that after moving it comes back to the exact same rest position as before. The optical system via a change in the image detected by the image processing electronics, detects the first bit of motion presented to it. At that instant of first motion, the image processing electronics will latch the values of the X, Y, and Z and if present rotary (R) scale positions. Each axis of the measuring machine has a readout scale to indicate position. The probe in this case would be calibrated with a reference sphere mounted on the measuring table.

In a simplified version of the Optical Touch Probe, the Z axis sensor can simply be a blade that obscures part of the collimated light coming across the top of the main probe shaft and the blade. A photodetector senses when motion has been made in the Z axis by the change in light levels at the photodetector.

This presently described approach is completely free from lobbing error as trigger release methods are not used to determine probe position. Lobbing error results from a variation in the touch trigger style probe pretravel varying depending on the orientation of the part with respect to the probe. The longer the stylus is, the greater this component of error. The design presented here does not have this problem because the measurement is made with the probe in direct contact with the part under test without a trigger to require a pretravel.

Note that extremely light probing forces can be employed because the imaging system will detect when contact has been made with the part after the contact tip has moved only by as much as the resolution of the system. In practice, even a deflection of 0.0001" (0.0025 mm) will cause extremely light probing forces.

Note that if the stylus is removed from the probe and then replaced a recalibration is not needed because the system will detect the absolute position of the target on the contact tip within the field of view. This means that a wide variety of styli can be used interchangeably. Positional registration of the stylus is not to critical within 0.003" (0.075 mm) being perfectly acceptable, again because the absolute position of the stylus will be determined within the field of view of the video camera. The probe tips are magnetically mounted on the probe assembly and can be easily changed manually.

Note also that an operator of this system will be able to see the part being probed through the video camera at high magnification (100x to 500x typical). This is especially useful when probing intricate and small features with particularly small contact tips. If a zoom lens is employed a wide view of the part can be seen as the stylus is being positioned near a feature of the part being inspected. When the measurement needs to be taken, the lens system can be zoomed to higher magnification where greater accuracy is achieved.

The measuring system that the probe is mounted on can be programmed to halt the drive motors when an operator contacts the part under inspection. The measuring system senses contact when the target on the contact tip moves from its nominal position. This will prevent the stylus from being damaged. When the system is making gross moves and the contact tip target may move due to an inertial swing of the probe shaft or vibration a greater displacement of the target will be required to trip the safety requirement for the motors to halt.

Star probes are different from simple probes in that a cluster of any number of probe extensions can extend from the main probe shaft at different angles and lengths. With star probes we also know the rotation about the main shaft axis of the probing assembly and can thereby determine the position of the contact tip at the distal end of the probe extensions.

To accomplish this, at the top of the main shaft of the probe is provided with two arms. As described before, these arms typically are at right angles to each other and also at right angles to the main shaft of the probe. At the distal end of each arm is a small target pin extending up from the arm. Each of these two cones is separately imaged by a series of mirrors onto the video camera as before. The X,Z coordinates of the tip of one cone and Y,Z components of the tip of the other cone are determined by the video camera and analysis system (programmed computer).

The X,Y coordinates of the target at the bottom end of the main probe shaft are discerned by the video image analysis system as before. The tips of the two cones on the arms and the center of the typically spherical shaped contact tip comprise a plane. Since the two target pins and the target contact tip are rigidly held such that the distance between all three points remains invariant, for all three points an exact X, Y, and Z coordinate can be solved.

Each probe extension ends in a contact tip. The center of this contact tip is in a rigidly fixed relationship with the three known primary points. While the probe is in contact with the part under inspection the X, Y, and Z coordinates for the two target pins and the target sphere are determined by the vision system. The position of the center of the contact ball is then known from the coordinates of the target pin and target sphere.

A motorized rotary bearing is placed between the video camera and the entire probe assembly which includes the mirrors that reflect the position of the two cones back up into the video camera. If the contact tip(s) of the star probe are not touching the part and the probe assembly is slowly rotated then the rotary translation is known between position of the three primary points and their new coordinates. With an ideal error free bearing and the target sphere directly on the optical center line this translation would be a pure angular rotation. Due to runout in the bearing and the fact that the main shaft of the probe is not perfectly centered about the optical axis, this will in practice be a true three dimensional vector translation.

A software lookup table holds error correction data for the bearing based on its angular rotation. When a new probe is loaded, the mirror assembly is rotated to a home position. In this home position, an absolute fix can be made on the star probe and the X, Y, and Z coordinates of the three principal points, the two cone tips and the center of the target sphere. When the star probe is rotated, the new X, Y, and Z coordinates are determined for the three principal points based on the change in position of the cones and target in the field of view.

An alternative and simplified method for determining the contact position of the distal contact tips is to mount the star probe rather rigidly with an elastic member that has excellent "memory;" meaning that the probe-will return nearly exactly to its nominal position (±0.000005–10 millionths of a second) and is fairly immune to rotational motion. Then to approach the contact position of the part to be inspected slowly and register the position of the star probe only after a minimally small deflection from the nominal position. The probe can be calibrated using a reference sphere.

The autochange rack can accommodate any number of probe tips that can be automatically changed out for the probe tip currently on the probe assembly. To pick up a probe tip, the probe head is positioned above the probe tip and lower onto it. After the probe tip magnetically latches onto the probe assembly the probe tip can be slid out of the rack.

With the rotary bearing in the home position each time a probe is picked up, the probe tip position can be determined absolutely independent of the exact position of the magnet grabbing position as long as we grip the probe tip such that the tip is reasonably well centered (±0.003) in the optical field of view. A repositioning error from pick up to pick up within ±0.003 is a fairly wide open tolerance and easy to achieve. With current touch probe technology the repositioning error component from pick up to pick up directly limits the accuracy of the system unless a probe calibration is done each time the probe is changed.

Different target marking are used on each separate probe stylus. The video based measuring system the probe is mounted on senses which stylus is in place by the particular marking scheme associated with each individual stylus. The identity of a star probe is known to the system due to the marking scheme that can be interpreted by the system. For example, if the target is a circle, the number and position of breaks in that circle indicates the number of star probe extensions and their positions. The width of each break indicates the extension probe length. The parallelism of the radial edges of the circle forming the gap or lack thereof indicate the angle the probe is extending away from the main shaft of the probe. Other marking codes could also be used.

Because the stability and intrinsic repeatability and accuracy of my probing system is not determined by mechanical registration of the stylus to the probe assembly, the autochange rack can be made inexpensively. The autochange rack can be built in a linear form with a number of styli placed in a row. The rack may be mounted on a motorized rotary where the desired stylus is rotated into place. The rotary approach eats up less real state in the volume of the measurement stage.

The autochange rack may also be built on sliders that bring it in and out of measurement volume as needed. This will allow all the stage travel of the system to be used for part measurement with none of it taken away by the autochange rack.

When an optical element such as an auxiliary magnification lens is placed on the autochange rack, a reticle with calibration information is fixtured on the autochange rack at approximately the working distance of the lens. When the optical video probe comes to pick up the lens, it can immediately image the reticle and calibrate the system with the new lens attached. This eliminates the need for highly accurate magnetic contacts. If the auxiliary lens is off centered by say 0.002", the immediate calibration of the system via the reticle can accommodate for this misalignment.

By packaging the optics of the optical touch probe within the Z-quill of the coordinate measuring machine space is saved within the measurement volume of the coordinate measuring machine. Prior designs of optical systems for attachment to coordinate measuring machines have required that the optics be packaged external to the Z-quill since the touch trigger style probe would occupy the primary space below the Z-quill. Some of these designs have shown the optics as a separate module that can be exchanged for the touch trigger probe using an autochanging rack. This too limits the measuring volume and also limits the length of the optical path used in the optical probe design. The present design allows for optical paths of extended lengths all encompassed within the Z-quill.

In accordance with the invention, the image generating system may be a video camera operating at a frame rate in excess of thirty frames per second. Likewise, a pinhole may be used as the optical pattern. It also is recognized that the rack in the inventive system may support an auxiliary lens for changing overall magnification of the image generating system, with the lens including a precision reticle mounted on the rack below the auxiliary lens such that by viewing the reticle after the auxiliary lens is engaged by the probe supporting structure, the system can recalibrate itself for magnification and centering of the lens.

It will thus be seen that the objects set forth above, among those made apparent from the preceding description, are efficiently attained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A coordinate measuring machine comprising:
   A) a video based coordinate measuring system comprising:
      a) a video camera producing a video signal having a first optical axis and a focal plane where an image of a part to be measured is focused, said camera being mounted to move with respect to said part to be measured and generating an image in the form of a plurality of pixels; and
      b) a video monitor responsive to said video signal connected to said video camera for displaying an image of said part being on said focal plane; and,
   B) a touch probe mounted on support structure which allows it to be imaged by said video camera in said focal plane, said touch probe being adapted for mounting to said video camera and comprising:
      a) a contact tip;
      b) a target mounted to said contact tip in the field of view of said video camera, said video signal including an image of said target, said target being adapted to be imaged on said focal plane, the image of said target changing position in said focal plane in response to movement of said touch probe relative to said video camera from a central pixel having a first set of x and v coordinates; and
      c) an electronic circuit for analyzing said video signal to determine changes in the coordinates of the position of said target relative to said video camera.

2. A coordinate measuring machine as in claim 1, said probe further comprising:
   d) a second target on said probe, and
   e) a light source outputting light along a second optical axis perpendicular to said first optical axis for parfocal imaging of said second target on said focal plane to enable said video signal to measure coordinates, along a z axis of said tip in a direction orthogonal to said x and y axes.

3. A coordinate measuring machine comprising:
   A) an optical image to electronic signal converter comprising a focal plane and outputting a video signal;
   B) first imaging optics having a first optical axis for focusing an object plane on said focal plane;
   C) an optical touch probe mounted on support structure which allows said probe to be imaged by said electronic signal converter, said touch probe being adapted for mounting to said machine and comprising:
      a) a first target located within the field of view of said focusing optics and substantially in said object plane,
      b) a second target mounted to said probe, and
      c) second imaging optics having a second optical axis transverse to said first optical axis for parfocal imaging of said second target on said focal plane, said video signal including an image of said first and second targets; and
   D) an electronic circuit analyzing said video signal to determine changes in the coordinates of the position of said second target.

4. A machine as in claim 3 wherein said second target is located substantially on said first optical axis.

5. A machine as in claim 3 wherein said signal converter is the camera of an optical coordinate measuring machine.

6. A machine as in claim 3 wherein at least one of said targets comprises self illumination means.

7. A machine as in claim 3, wherein said second optical axis is orthogonal to said first optical axis.

8. A machine as in claim 3 wherein said touch probe is an elongated member mounted at a proximal end to said support structure, said first target being mounted to the distal end of said member and to a portion thereof configured and dimensioned for measuring contact with a workpiece.

9. A machine as in claim 8 wherein said elongated member extends in the same general direction as said optical axis and said first target is symmetrical when viewed parallel to said optical axis.

10. A machine as in claim 9 wherein said target comprises radially disposed indicia for indicating rotation thereof, said indicia also identifying said probe.

11. A machine as in claim 3 wherein said targets art located such that they define three mutually orthogonal axes.

12. A probe as in claim 11 wherein one of said axes becomes coaxial with said optical axis when said probe is mounted to a video based coordinate measuring machine.

13. A machine as in claim 12 wherein said electronic signal converter is a video camera.

14. A machine as in claim 3, further comprising:
   d) a third target mounted to said probe, and
   e) third imaging optics having a third optical axis transverse to said first optical axis for parfocal imaging of said target on said focal plane, wherein said electronic circuit determines the coordinates in space of said probe.

15. A machine as in claim 14 wherein said second and third optical axes are orthogonal to each other.

16. A machine as in claim 14, wherein said third optical axis is orthogonal to said first optical axis.

17. The machine as in claim 14 wherein said second and third targets are radially spaced away from said first optical axis.

18. A machine as in claim 17 wherein said second and third targets are equally spaced away from said first optical axis.

19. The method of utilizing a touch probe with a video based measuring machine comprising the steps of:
   A) mounting a touch probe on said machine with its distal end located substantially on the optical axis of said machine;
   B) focusing the image of said distal end on the focal plane of said machine;
   C) measuring motion along Cartesian coordinates X and Y orthogonal to said optical axis by analyzing the video signal produced by motion of the image of said distal end;
   D) parfocusing an image of a first target mounted on said probe that moves proportionally to movement of said probe along said optical axis such that the image of said first target also moves proportionally to said movement; and,
   E) measuring motion along Cartesian coordinate Z along said optical axis by analyzing the video signal produced by motion of the image of said first target.

20. The method defined in claim 19 wherein said first target is located substantially on said optical axis.

21. The method defined in claim 19 wherein said measuring of motion along Cartesian coordinate Z along said optical axis is accomplished by analyzing the video signals produced by motion of the parfocal images of said first target and a second target on said probe that also moves proportionally to movement of said probe along said optical axis such that the image of said second target also moves proportionally to said movement.

22. The method defined in claim 21 wherein said first target and a third target are located on radii from said optical axis parallel to Cartesian coordinates X and Y.

23. An optical coordinate machine comprising:
   (a) a touch probe having a distal end;
   (b) an imaging device having a focal plane and outputting a signal containing image information;
   (c) a support structure holding said touch probe with said distal end in a nominal zero position while allowing said distal end to be displaced from said nominal zero position upon the application of force to said distal end;
   (d) first imaging optics imaging said distal end in said focal plane:
   (e) a computer for receiving said signal containing image position information from said imaging device having a focal plane and generating in response thereto indications of changes in the coordinates of said image of said distal end in said focal plane;
   (f) a target mounted on said probe; and,
   (g) optics for imaging said target in said focal plane, wherein said computer indicates changes in the vertical coordinate of said target.

24. An optical coordinate machine as in claim 23, further comprising,
   (h) a pair of arms extending horizontally from a first position on said probe;
   (i) a pair of targets each mounted at a respective point on its respective end of one of said arms at a position displaced from said first position; and
   (j) optics for imaging said targets in said focal plane, said computer calculating changes in the vertical position of said distal end of said probe.

25. An optical coordinate machine as in claim 23, further comprising:
   (k) additional touch probe assemblies, said touch probe and said touch probe assemblies each comprising:
      A) a touch probe;
      B) a mounting assembly to which said touch probe is mounted comprising:
         i) first cooperative magnetic means,
         ii) first cooperative indexing means,
         iii) cooperative key means: and
   (l) a rack for storing each of said touch probe assemblies comprising:
      A) multiple cooperative lock means each for receiving said key means of one touch probe assembly to store said assembly.

26. An optical coordinate measuring machine as in claim 25, further comprising
   (m) a touch probe assembly head for securing one of said touch probes to said imaging device comprising:
      A) second cooperative magnetic means for magnetically engaging and holding said first cooperative magnetic means,
      B) second cooperative indexing means for engaging said first cooperative indexing means and establishing a fixed indexed position of a touch probe assembly in relation to said head when said magnetic means are engaged.

27. An optical coordinate measuring machine as in claim 26 wherein said imaging device comprises a video imaging head and said touch probe assembly head further comprises:
   (n) means for removably mounting said assembly head to said imaging device.

28. An optical coordinate measuring machine as in claim 27 wherein said means for removably mounting said assembly head to said video imaging head comprises:
   i) third cooperative magnetic means,
   ii) third cooperative indexing means and
   iii) second cooperative key means; and said rack further comprises:
      b) second cooperative lock means for receiving said second key means of said assembly head.

29. An optical coordinate measuring machine as in claim 28 wherein said lock means each comprises a horizontally disposed generally C-shaped channel and said key means each comprises a generally ovoid shape fitting into said channel and is mounted on an arm extending from each of said assemblies.

30. An optical coordinate measuring machine as in claim 25; further comprising:

(m) a video imaging head; and
wherein said touch probe assembly is adapted for mounting to said video imaging head and further comprises:
i) means for resiliently holding a distal end of a touch probe in a nominal zero position;
ii) means for imaging said distal end in the focal plane of said video imaging head; and
iii) computer means for receiving information from said video imaging head and indicating changes in the coordinates of said image of said distal end in said focal plane.

31. An optical coordinate measuring machine as in claim 30 wherein said distal end of said probe is rigidly mounted to a rigid vertically oriented shaft and the proximal end of said shaft is resiliently mounted to said assembly.

32. An optical coordinate measuring machine as in claim 31, further comprising:

n) a shaft edge at the proximal end of said shaft; and,
o) means for imaging said edge in the focal plane of said video imaging head; and
wherein said computer means also indicates changes in the vertical coordinate of said edge.

33. An optical coordinate measuring machine as in claim 32, and;

D) a pair of arms extending horizontally from the proximal end of said shaft;
E) a pair of sharp edges each mounted at the distal end of one of said arms;
F) means for imaging said edges in the focal plane of said video imaging head; and,
wherein said computer means also indicates changes in the vertical position of said edges and rotation thereof about the vertical orientation of said shaft.

34. The method of measuring a workpiece using a video based coordinate measuring machine comprising a video camera, monitor and computer, said method comprising the steps of:

A) mounting a touch probe to said video camera with its contact tip imaged on said video camera and monitor; and
B) using said video camera and computer to determine the X, Y coordinates of the contact tip when it is in contact with a workpiece mounted in the machine.

35. The method of claim 34, wherein said video camera and computer determine said coordinates at the video refresh rate of said video camera.

36. The method of claim 34 further comprising the additional step of:

C) using said video camera and computer to determine the Z coordinate of the touch probe by illuminating a target on the probe with a beam of light parallel to said X, Y coordinates to form an image of the said target on the video camera.

37. The method of claim 36 said last step further comprising:

a) illuminating a second target on the touch probe with a beam of light parallel to said X,Y coordinates to form an image of said second target on the video camera.

38. The method of claim 37 further comprising the additional step of determining rotation of the touch probe by using said video camera and computer.

39. Apparatus for determining the position of a point in space comprising:

(a) a movable support system outputting information with indicates the position of said movable support system;
(b) a touch probe comprising:
i) a contacting portion; and
ii) an optical pattern including first and second imagable characteristics;
(c) probe supporting structure mounted on said moveable support system, said probe being mounted on said probe supporting structure, allowing said probe to be moved by said movable support system, said probe supporting structure supporting said probe while allowing said contacting portion and said optical pattern to be displaced along a path determined by said probe supporting structure upon the application of force to a contacting point on said contacting portion, the displacement of said optical pattern causing changes in said characteristics;
(d) an image generating system for receiving an image and outputting an image signal;
(e) first imaging optics imaging said first and second imagable characteristics on said image generating system to cause said image generating system to generate a signal containing an image of said first and second imagable characteristics, the changes in said characteristics caused in response to movement of said contacting portion indicating the position of said point of contact; and
(f) a computer for receiving said signal containing said images of said first and second imagable characteristics and the output of said movable support system, and calculating the position in three dimensional space of said point of contact.

40. Apparatus as in claim 39, further comprising a movement signal source controlling the movement of said movable support system to move it to a plurality of at least three points, and wherein said computer determines the orientation of a plane tangent to said object between said points, whereby the shape of an object is determined as a set of points with specific locations in three dimensions.

41. Apparatus as in claim 39, wherein said image generating system is a video camera operating at a frame rate in excess of thirty frames per second.

42. Apparatus as in claim 39, wherein said optical pattern is a reflective circle.

43. Apparatus as in claim 39, wherein said optical pattern is a pinhole.

44. Apparatus as in claim 39, wherein said image generating system is a multi-element CCD.

45. Apparatus as in claim 39, further comprising structure associated with said probe and including a third imageable characteristic imaged by said image generating system and analyzed by said computer to determine position.

46. Apparatus as in claim 39, wherein said such probe comprises a first arm extending from a mounting secured to said probe supporting structure, said optical pattern including first and second imagable characteristics being disposed at the other end of said first arm, said touch probe further comprising an extension extending from said mounting, said extension being mounted at one point adjacent said mounting and extending to a point remote from said point adjacent said mounting to a remote point, said remote point including said second imagable characteristic.

47. Apparatus as in claim 39, wherein said such probe comprises a first arm extending from a mounting secured to said probe supporting structure, said optical pattern including said first imagable characteristic being disposed at the other end of said first arm, said second imagable characteristic being mounted adjacent said mounting secured to said probe supporting structure.

48. Apparatus as in claim 39, wherein said probe has three points on its surface which generally defined an L shape, the corner of the L shape bearing an imagable characteristic, one end of said L-shape including a touch probe body for contacting a point to be measured, and the other end of said L shape including an a second imagable characteristic, said probe being mounted proximate said other end of said L shape.

49. Apparatus as in claim 39, further comprising a rack supporting a plurality of attachments adapted to be mounted on said probe supporting structure, said rack comprising structure for supporting a probe supporting structure or other attachment, and said rack further comprising retention structure adapted to retain and hold an attachment upon the application of force by said probe supporting structure in a direction resulting in disengagement of said attachment from said probe supporting structure, whereby said probe supporting structure may move to engage an attachment in said rack, pull away from said rack, leaving said attachment in place on said rack, and move into engagement with another attachment allowing said probe supporting structure to remove said other attachment from said rack.

50. Apparatus as in claim 49, wherein said rack supports an auxiliary lens for changing overall magnification of the image generating system, said lens including a precision reticle mounted on the rack below the auxiliary lens such that by viewing the reticle after the auxiliary lens is engaged by the probe supporting structure, the system can recalibrate itself for magnification and centering of the lens.

51. Apparatus as in claim 39, wherein said touch probe comprises a flexibly mounted arm secured to a mounting at one end of said arm.

52. Apparatus as in claim 51, wherein the other end of said flexible arm supports said optical pattern.

53. Apparatus as in claim 51, wherein said mounting is magnetically coupled to said probe supporting structure.

54. Apparatus as in claim 39, wherein said such probe comprises a first arm extending from a mounting secured to said probe supporting structure, said optical pattern including said first imagable characteristic being disposed at the other end of said first arm, said touch probe further comprising an extension extending from said mounting, said extension being mounted at one point adjacent said mounting and extending to a point remote from said point adjacent said mounting to a remote point, said remote point including said second imagable characteristic.

55. Apparatus as in claim 54, wherein said mounting is flexible and said arm is rigid.

56. Apparatus as in claim 55, further comprising a second extension being mounted at a point adjacent said mounting and extending to an other remote point remote from said point adjacent said mounting, said other remote point including a third imagable characteristic.

57. Apparatus as in claim 56, wherein said probe arm, and said first and second extensions form three members which extend in directions substantially across the directions of extension of said other members.

58. Apparatus as in claim 56, wherein said imaging optics comprises separate focusing members for each of said first, second and third imagable characteristic.

59. Apparatus as in claim 58, wherein said first imagable characteristic includes elements which define a closed shape, and said second imagable characteristic is formed by a pair of studs, one mounted on each of said extensions.

60. Apparatus for determining the position of a point in space comprising:

(a) a movable support system outputting information with indicates the position of said movable support system;

(b) a touch probe comprising:
  i) a contacting portion; and
  ii) an optical pattern including first and second imagable characteristics;

(c) a flexible probe supporting structure mounted on said moveable support system, said probe being mounted on said probe supporting structure, allowing said probe to be moved by said movable support system, said probe supporting structure supporting said probe while allowing said contacting portion and said optical pattern to be displaced along a path determined by said probe supporting structure upon the application of force to a contacting point on said contacting portion, the displacement of said optical pattern causing changes in said characteristics;

(d) an image generating system for receiving an image and outputting an image signal;

(e) first imaging optics imaging said first and second imagable characteristics on said image generating system to cause said image generating system to generate a signal containing an image of said first and second imagable characteristics, the changes in said characteristics caused in response to movement of said contacting portion indicating the position of said point of contact; and (f) a computer for receiving said signal containing said images of said first and second imagable characteristics and the output of said movable support system, and detecting change in the position in three dimensional space of said point of contact.

* * * * *